(12) United States Patent
Scharenbroch et al.

(10) Patent No.: US 7,364,301 B2
(45) Date of Patent: Apr. 29, 2008

(54) VEHICULAR OPTICAL SYSTEM

(75) Inventors: Gregory K. Scharenbroch, Kokomo, IN (US); Joseph E. Harter, Jr., Kokomo, IN (US); Steven G Skiver, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 261 days.

(21) Appl. No.: 10/986,240

(22) Filed: Nov. 11, 2004

(65) Prior Publication Data

US 2006/0098166 A1  May 11, 2006

(51) Int. Cl.
  *G03B 21/00* (2006.01)
  *G03B 21/26* (2006.01)
  *G03B 21/28* (2006.01)
  *B60Q 1/26* (2006.01)
  *G08B 23/00* (2006.01)
  *G06K 9/00* (2006.01)

(52) U.S. Cl. .............. 353/13; 353/28; 353/37; 353/98; 362/503; 340/576; 382/117; 382/118

(58) Field of Classification Search .............. 353/13, 353/14, 29, 28, 37, 98, 99; 345/7, 8, 5; 359/13, 359/269, 443, 449, 451, 452, 630, 632, 634; 348/77, 115, 148, 744; 340/425.5, 575, 576; 362/276, 464, 466, 503, 802; 382/115, 117, 382/118; 349/11
See application file for complete search history.

(56) References Cited

U.S. PATENT DOCUMENTS

| | | | | |
|---|---|---|---|---|
| 5,724,189 A * | 3/1998 | Ferrante | ............... | 359/634 |
| 5,734,357 A * | 3/1998 | Matsumoto | ............... | 345/7 |
| 5,763,063 A * | 6/1998 | Pass et al. | ............... | 428/216 |
| 6,359,737 B1 * | 3/2002 | Stringfellow | ............... | 359/631 |
| 6,391,400 B1 * | 5/2002 | Russell et al. | ............... | 428/34 |
| 6,967,569 B2 * | 11/2005 | Weber et al. | ............... | 340/436 |
| 2002/0116106 A1 * | 8/2002 | Breed et al. | ............... | 701/45 |
| 2003/0232197 A1 * | 12/2003 | Disteldorf | ............... | 428/411.1 |

* cited by examiner

*Primary Examiner*—Rochelle Blackman
(74) *Attorney, Agent, or Firm*—Jimmy L. Funke (57) ABSTRACT

An optical system for vehicle operating monitoring is disclosed. The optical system includes at least one illuminator that illuminates a profile of a vehicle operator and an imager in optical communication with a reflector that captures a reflected image of the vehicle operator profile from the reflector. A method is also disclosed.

22 Claims, 9 Drawing Sheets

VEHICULAR OPTICAL SYSTEM

FIELD OF THE INVENTION

The invention relates to vehicle operator safety systems and more particularly to an optical system for vehicle operator monitoring.

BACKGROUND OF THE INVENTION

Optical systems for vehicle operator monitoring have been used in various applications including, but not limited to, occupant detection and occupant security. The proposed design and integration of such conventional optical systems have included many performance and functionality issues, which impacts cost and complexity in the overall design of the passenger compartment area.

Figure 10A:
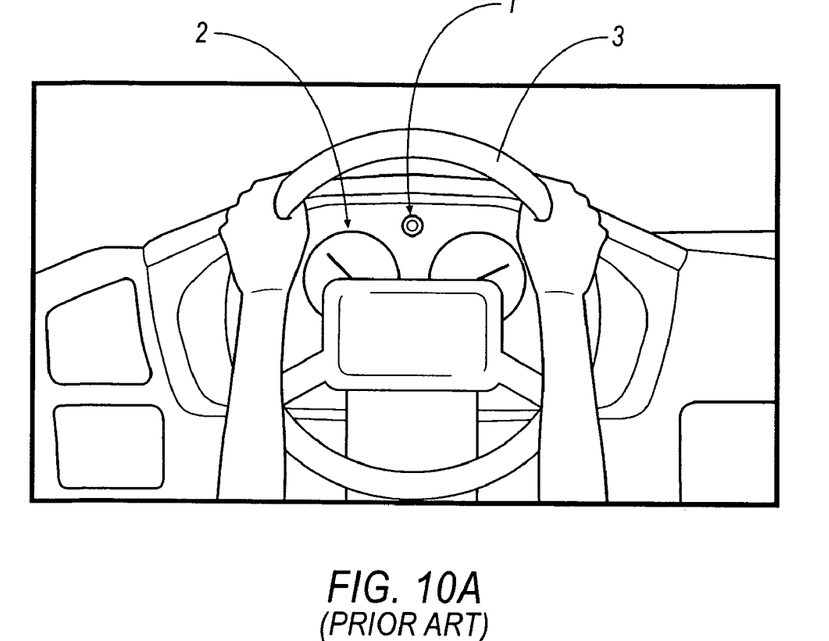
FIG. 10A is first perspective view of a conventional optical system.
Figure 10B:
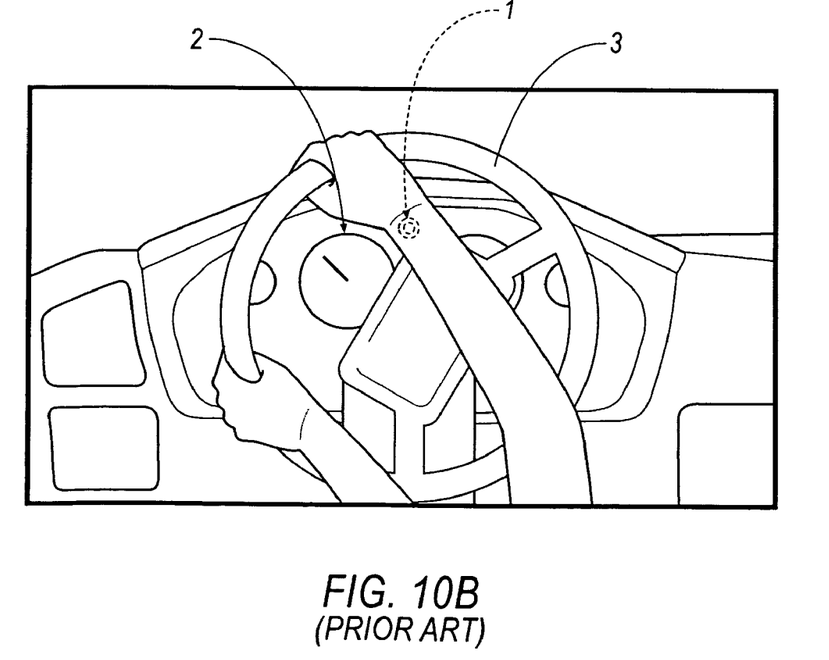
FIG. 10B is a second perspective view of the conventional optical system of FIG. 10A.
Figure 11:
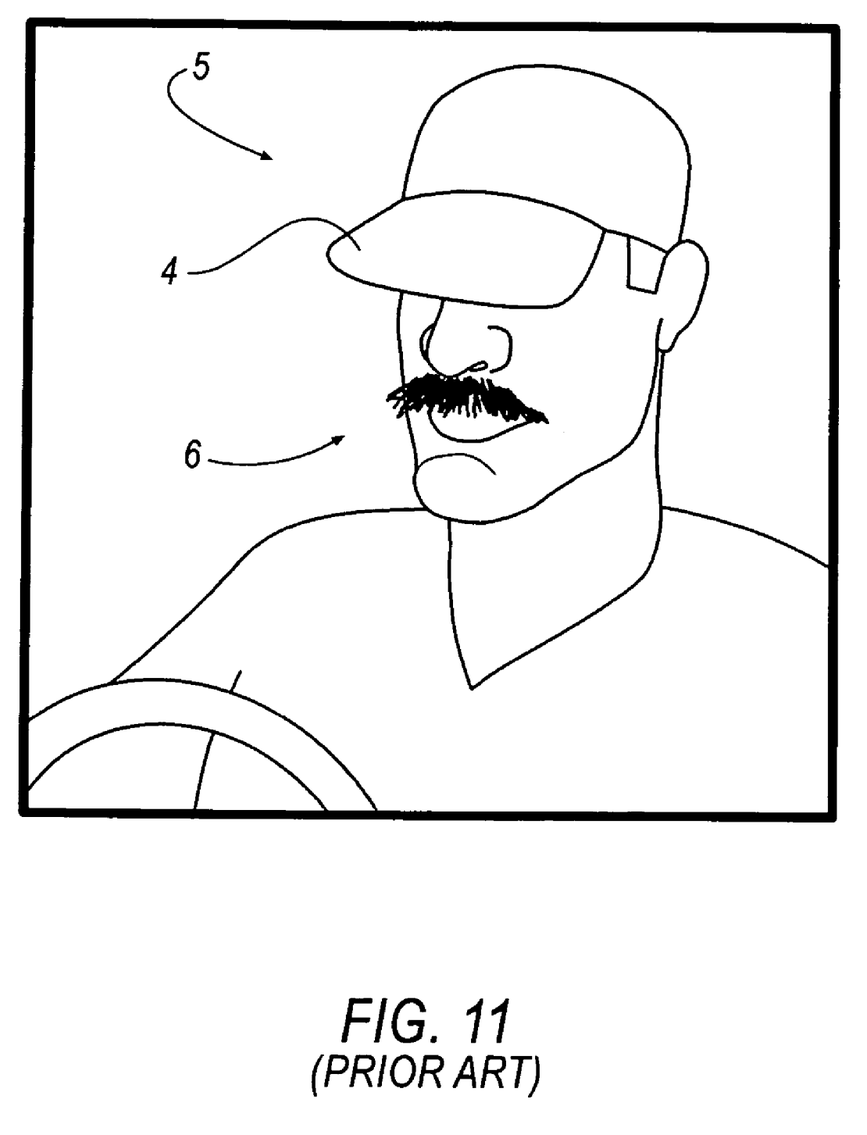
FIG. 11 is a perspective view of an image captured by a conventional optical system.

Referring to FIGS. 10A-11, conventional integration designs have located an imager 1 (i.e., a camera) of the optical system within the instrument cluster 2, on the A-pillar, or in the center console. In such implementations, the imager 1 was located in a directly opposing relationship, relative to the driver, to directly capture images of the driver during the operation of the vehicle. However, in order to ensure the proper operation of such an optical system, the imager 1 must not be obstructed at any time. As seen in FIG. 10B, by locating the imager 1 in the instrument cluster 2, the imager 1 is susceptible to obstructions caused by the driver's hands, wrists, and arms when the driver moves his hands from the 2-o'clock and 10-o'clock positions (FIG. 10A) to a new position proximate the 12-o'clock area (FIG. 10B) of the steering wheel 3. Referring to FIG. 11, if the imager is located about a headliner area, the brim 4 of an operators' hat 5 may obstruct a portion of the driver's face 6. In yet another situation, if the imager is located in the A-pillar area, obstructions to the driver's face may be reduced, however, an A-pillar located imager is limited to capturing a partial profile of the driver's face due to the off-center location of the imager.

As such, a need exists for improving optical systems for vehicle operator monitoring.

BRIEF DESCRIPTION OF THE DRAWINGS

The inventors of the present invention have recognized these and other problems associated with optical systems for vehicle operator monitoring. The present invention will now be described, by way of example, with reference to the accompanying drawings, in which.

DESCRIPTION OF THE PREFERRED EMBODIMENT

Figure 1A:
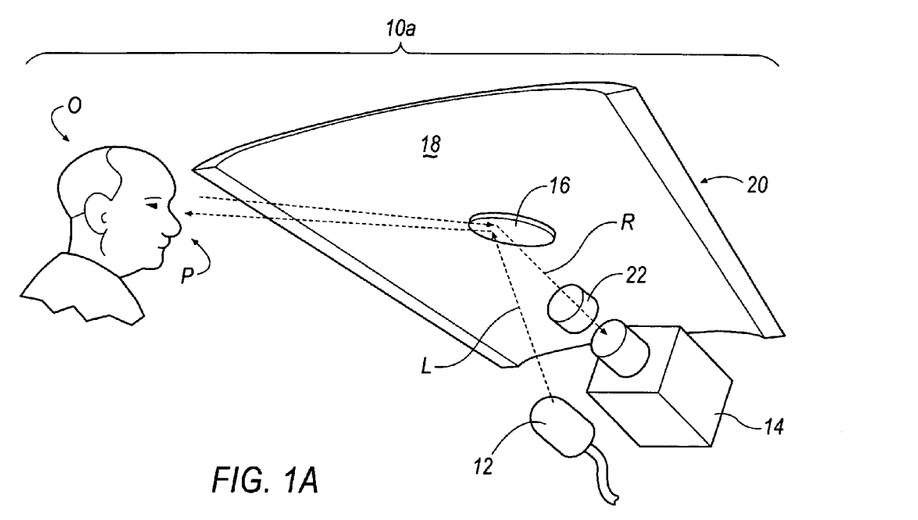
FIG. 1A is an exploded, perspective view of an optical system according to an embodiment.
Figure 1B:
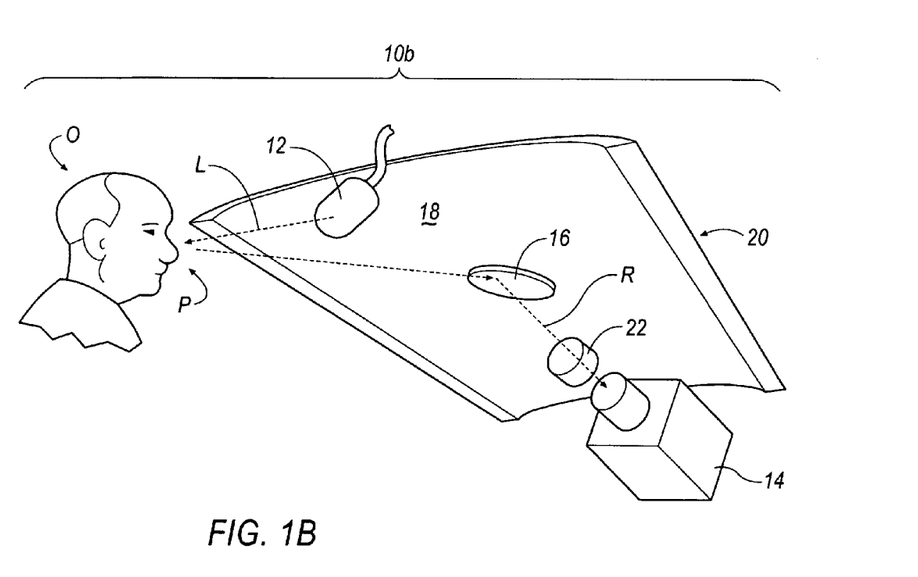
FIG. 1B is an exploded, perspective view the optical system according to another embodiment.

The above described disadvantages are overcome and a number of advantages are realized by an inventive optical system 10a, 10b as shown generally in FIGS. 1A and 1B. The optical system 10a, 10b comprises at least one illuminator 12, an imager 14, and a mirror, which is hereinafter referred to as a reflector 16. Preferably, the imager 14 is substantially located about the centerline the vehicle operator's profile, P. The reflector 16 is located about an inboard surface 18 of a windshield 20 and in optical communication with the imager 14. If desired, a band-pass filter 22 may be positioned in front of the imager 14 to block ambient light and prevent saturation of the imager 14.

As shown in FIG. 1A, the illuminator 12 may be co-located with the imager 14, or, alternatively, as shown in FIG. 1B, the illuminator 12 may be remotely located with respect to the imager 14. When the illuminator 12 is co-located with the imager 14, light (i.e., dashed line L) from the illuminator 12 is reflected off of the reflector 16 toward the vehicle operator, O. When the illuminator 12 is remotely located from the imager 14, light, L, from the illuminator 12 is projected directly to the vehicle operator, O, which is then reflected toward the reflector 16. As a result, the imager 14 captures an image of the operator's profile, P, with reflected optics (i.e. dashed line R). Accordingly, the light, L, that is directed back to the imager 14 by the reflector 16 enables the optical system 10a, 10b to provide an unobstructed operator profile, P.

Figure 2A:
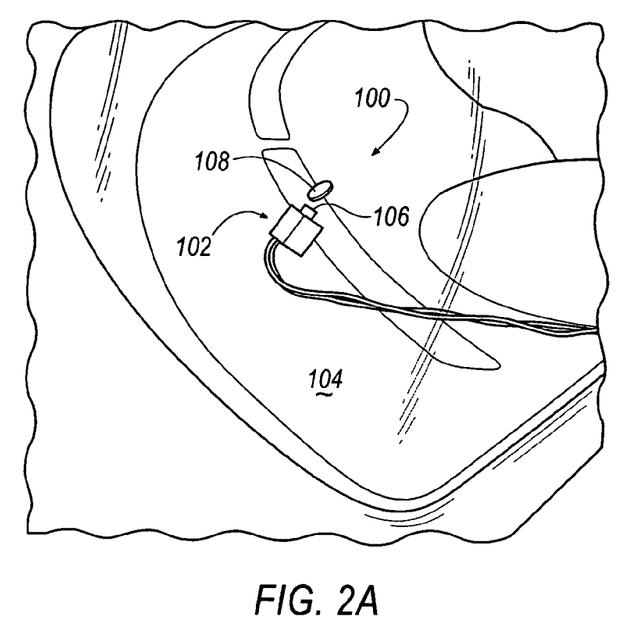
FIG. 2A is an exterior, environmental perspective view of the optical system according to an embodiment.
Figure 2B:
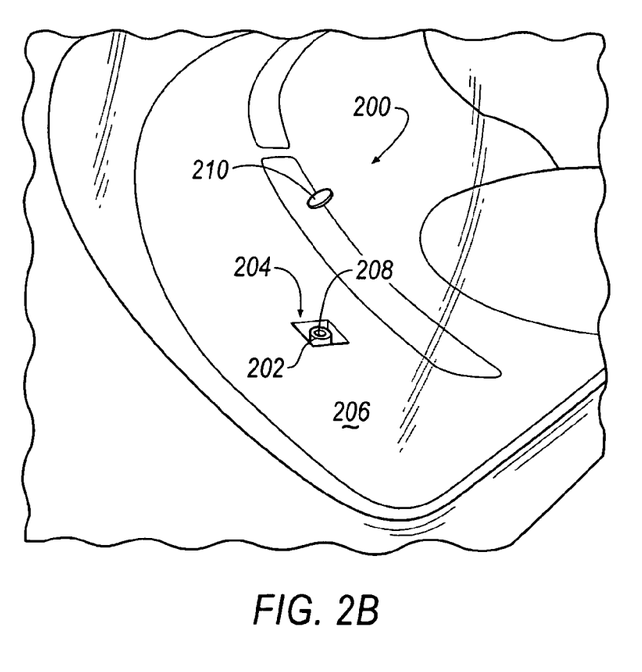
FIG. 2B is an exterior, environmental perspective view of the optical system according to another embodiment.

Referring to FIG. 2A, an imager 102 of an optical system 100 is located on top of a valance panel 104. A lens 106 of the imager 102 directly faces a reflector 108 in such a manner as to capture an image of the operator's profile, P, with reflected optics as described above. According to another embodiment shown in FIG. 2B, an imager 202 of an optical system 200 is located within a recessed bezel 204 of a valance panel 206. As similarly described in FIG. 2A above, a lens 208 of the imager 202 directly faces a reflector 210 in such a manner as to capture an image of the operator's profile, P, with reflected optics. As seen more clearly in FIG. 3, when located in the recessed bezel 304, the optical system 300 may be closed-out by a tinted, but optically transparent panel 316 such that the vehicle operator is not able to notice the presence of the optical system 300.

Figure 3:
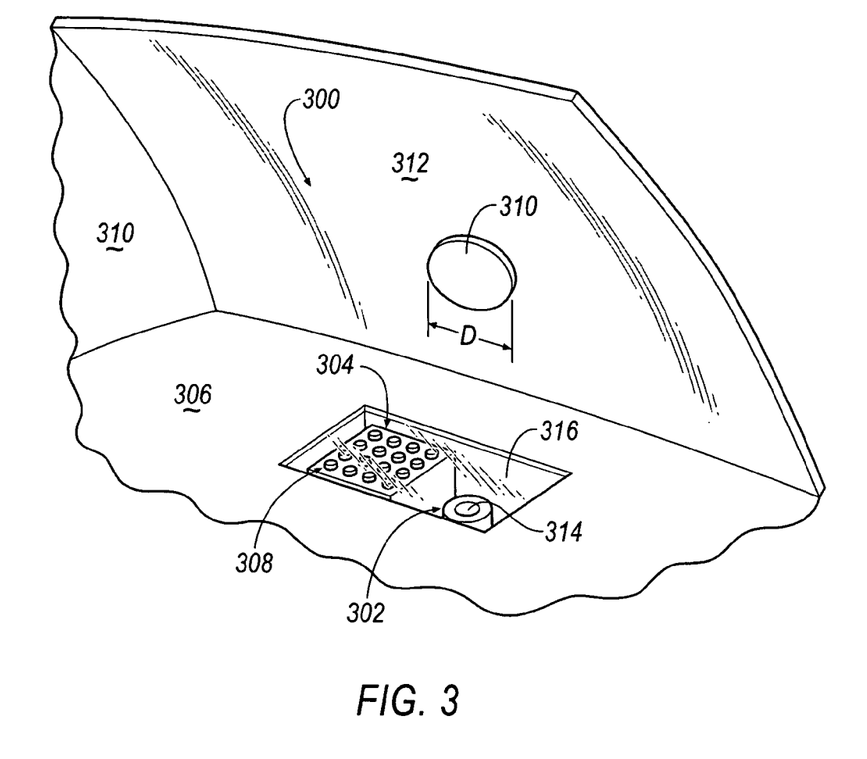
FIG. 3 is a passenger compartment perspective view of the optical system according to an embodiment.
Figure 4A:
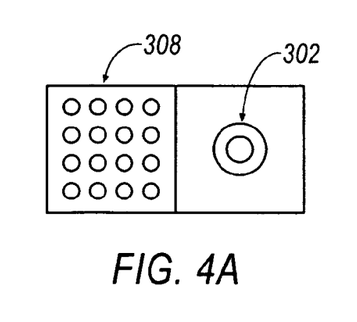
FIGS. 4A is a top view of an imager and illuminator arrangement according to the embodiment shown in FIG. 3.
Figure 4B:
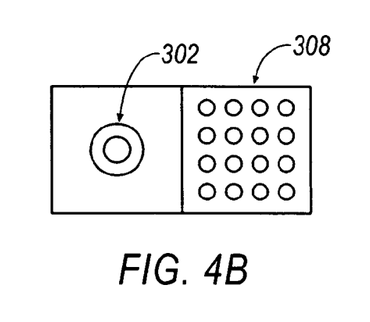
FIGS. 4B-4D are alternative embodiments of the imager and illuminator arrangement of FIG. 4A.
Figure 4C:
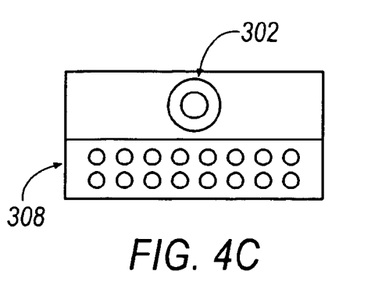
Figure 4D:
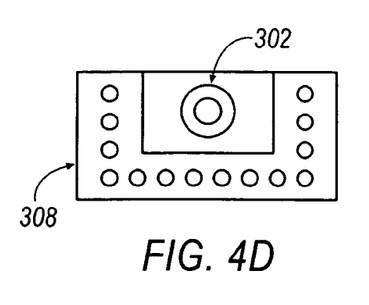

Referring to both FIGS. 3 and 4A, the optical system 300 is shown in greater detail. The optical system 300 is based upon the general representations shown in FIGS. 1A and 2B in that an imager 302 is positioned within the recessed bezel 304 of a valance panel 306 with co-located illuminators 308. As illustrated, an array of sixteen illuminators 308 are shown in four-by-four matrix to the left of the imager 302; however, the optical system 300 is not limited to a specific number of illuminators 308 in any specific location or position. For example, one illuminator 308 or the four-by-four matrix of illuminators 308 may be positioned about the A-pillar 310. Alternatively, if co-located with the imager 302, the illuminators 308 may be positioned to the right of the imager 302 (FIG. 4B), forwardly of the imager 302 (FIG. 4C), or around the imager 302 in a horseshoe-type configuration (FIG. 4D).

Figure 5:
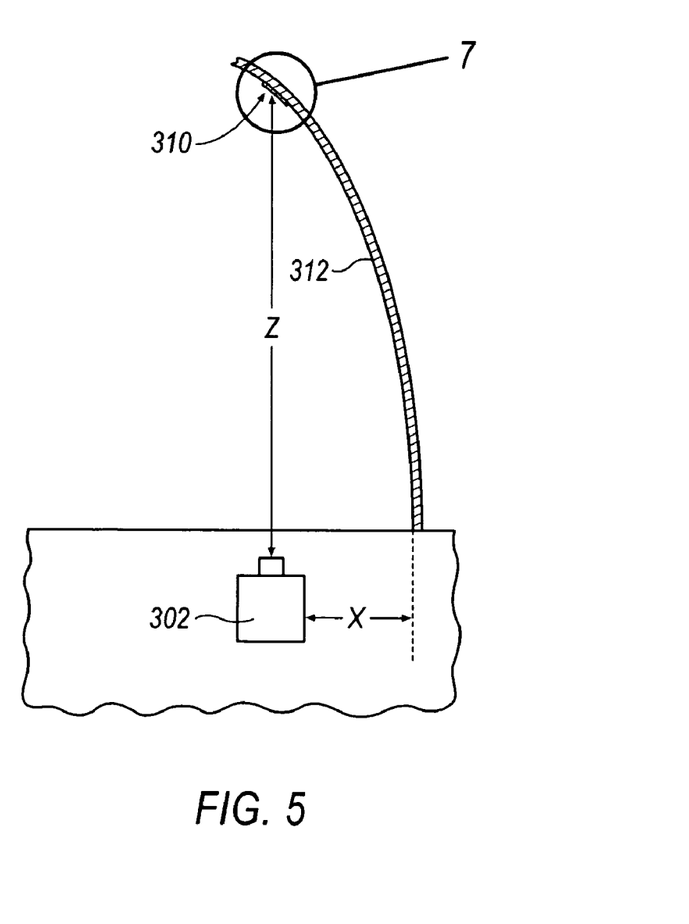
FIG. 5 is a partial cross-sectional view of the imager located about an instrument panel and a reflector positioned on an interior surface of a windshield according to an embodiment.

If the illuminator(s) 308 is/are co-located with the imager 302, an integral package may be achieved that results in a reduction of wiring and installation time of the optical system 300. Although an embodiment showing illuminators 308 positioned rearwardly of the imager 302 is not shown, such an embodiment may be implemented. However, in referring to FIG. 5, if illuminators 308 were to be positioned rearwardly of the imager 302, the vertical distance, Z, that is relative to the position of the imager 302 and reflector 310 is increased (i.e., the reflector will reside in a higher position on the windshield 312). Because the reflector 310 may not be entirely transmissive (i.e., the reflector 310 may be approximately 90% transparent), the reflector 310 may become optically noticeable to the vehicle operator and appear to be a smudge or blur on the windshield 312. As a result, it may be preferable to locate the imager 302 as close to the windshield 312 as possible (i.e., reduce the horizontal distance, X, that is relative to the position of the imager 302 and the windshield 312).

Figure 6A:
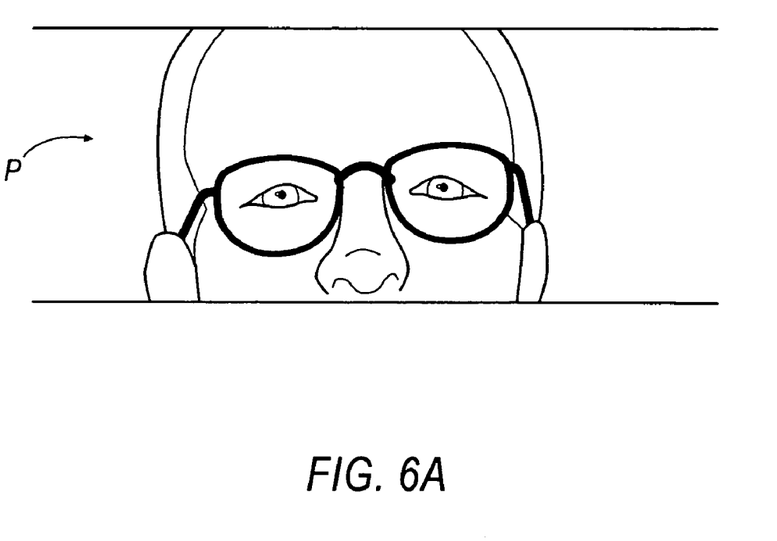
FIGS. 6A illustrates a profile of a vehicle operator according to an embodiment.

According to an embodiment of the invention, the horizontal distance, X, may be any desirable length ranging approximately between zero and twelve inches. Because the vertical distance, Z, is dependent upon the length of the horizontal distance, X, due to curvature of the windshield glass 312 and slope of the valance panel, the vertical distance, Z, should be reduced such that the reflector 310 is not noticeable to the vehicle operator, as described above. According to an embodiment, a horizontal distance, X, may be selected such that the vertical distance, Z, is within any desirable length ranging approximately between zero and three inches. It will be appreciated that the invention is not limited to the dimensions described above and that the invention may be practiced by using any desirable dimensions that defines the vertical distance, Z, and the horizontal distance, X. Accordingly, as seen in FIG. 6A, when the vertical and horizontal distances, X, Z, are reduced, the aspect ratio of the operator's profile, P, is reduced, and, in reference to FIG. 6B, when the vertical and horizontal distances X, Z, are increased, the aspect ratio of the operator's profile, P, is increased. In situations when a larger profile, P, is called for, the general surface area of the reflector 310 is correspondingly increased as well.

Figure 7:
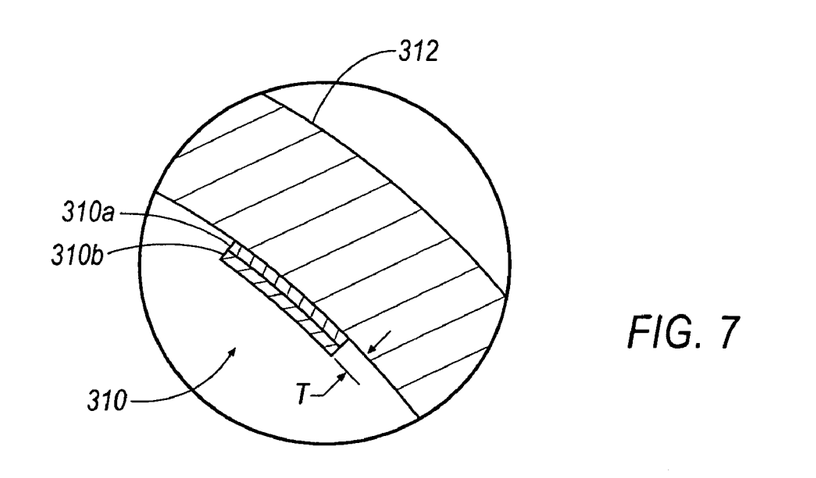
FIG. 7 is a magnified view of the windshield and reflector illustrated in FIG. 5 according to an embodiment.

Referring to FIG. 7, a magnified view of the reflector 310 is shown according to an embodiment. In operation, the reflector 310 reflects infrared (IR) light and passes visible light. As illustrated, the reflector 310 comprises a relatively thin layer of substrate material 310a and a relatively thin layer of reflective film 310b. The substrate material 310a may be a quartz material, which is sold under the trade-name BOROFLOAT™, and the reflective film 310b consists of a multi-layer dielectric coating. The reflector 310 may be referred to in the art as a "Hot Mirror" and is commercially available from Edmund Industrial Optics of Barrington, N.J. The reflector may include any desirable thickness, T, such as, for example, that is approximately equal to one-tenth of a millimeter, and may include any desirable shape, such as, for example, a circular disc (FIG. 3) or a rectangular sheet. According to an embodiment, if the reflector 310 is a circular disc, the diameter, D, may be approximately equal to 25 mm. The reflector 310 may be adhered to the windshield 312 with any type of adhesive. As such, the reflector 310 may be manufactured in a similar fashion as a sticker that is manually applied to the windshield 312.

If the windshield 312 has an extreme curvature, the resultant image captured by the imager 302 may be unevenly magnified and distorted. However, if the windshield curvature is known, image distortion software (not shown) may treat the captured image to provide an expected, correct image.

In an embodiment, the imager 302 may be a Complementary Metal Oxide Semiconductor (CMOS) imager, or, alternatively, a Charge-Coupled-Device (CCD) imager, and the illuminators 308 may be IR illuminators. Although the above-described optics are related to IR light, the invention is not limited to process light in the IR spectrum. As such, the illuminators may comprise any type of incandescent light emitting diode or bulb, and the appropriate non-IR imager and reflector may be accordingly selected.

Figure 6B:
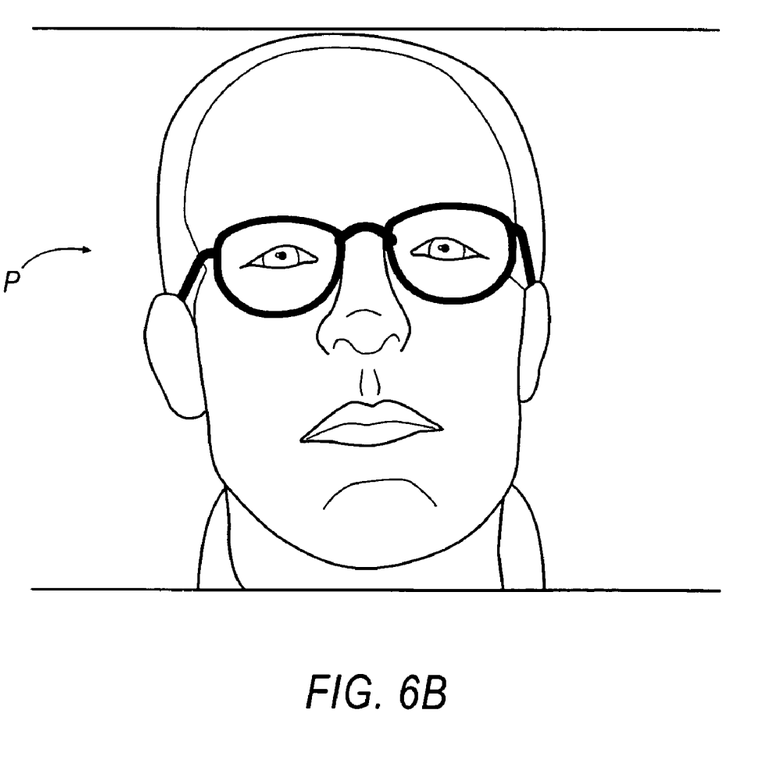
FIG. 6B illustrates another profile of a vehicle operator according to an embodiment.
Figure 8:
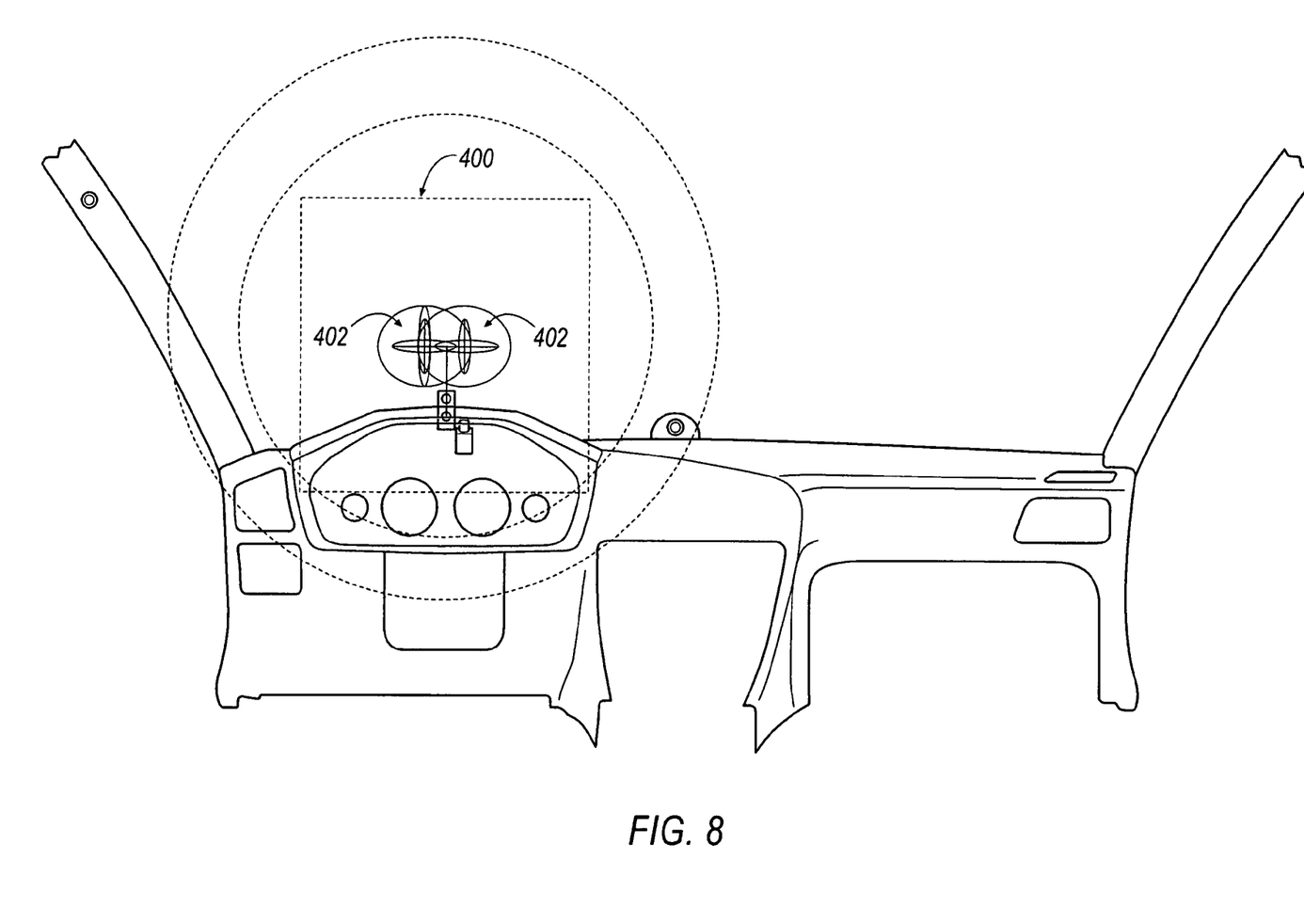
FIG. 8 is a passenger compartment view illustrating a field of view of the optical system.

Depending on the horizontal distance, X, of the CMOS imager 302, the CMOS imager 302 may include a field of view lens 314 ranging from $+/-10°$ to $\times/-35°$. Referring to FIG. 8, as a result of the horizontal position, X, and the chosen field of view lens 314, a head-box 400 that defines the aspect ratio of the captured operator profile, P, may be increased or reduced as desired. As such, the CMOS imager 302 may be limited to focusing on eye ellipses 402 in relation to the operator profile, P, illustrated in FIG. 6A, or alternatively, the CMOS imager 302 may be allowed to capture an entire image of the operator profile, P, as shown in FIG. 6B.

Figure 9A:
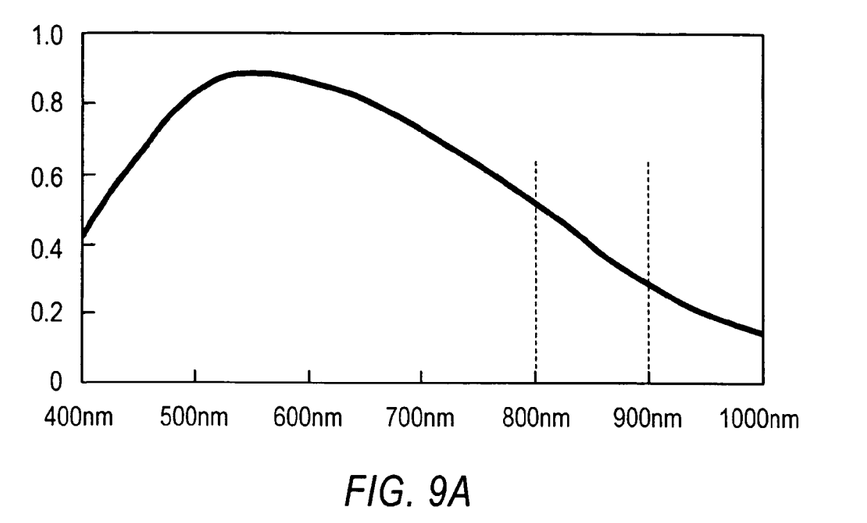
FIG. 9A is a normalized CMOS imager response curve.

In reference to FIG. 9A, a normalized CMOS imager response curve is shown. The x-axis of the diagram ranges from 400 nm to 1000 nm and the y-axis represents sensitivity on the order of 0% to 100%. Generally, the chart represents the number of photons the CMOS imager 302 collects, and, when held efficiently, the CMOS imager 302 turns the photons into electrons. As illustrated, the CMOS imager 302 typically peaks when receiving light in the visible light band between 400 nm and 700 nm. An absolute peak in sensitivity occurs approximately between the 500 nm and 600 nm range. As illustrated in the non-visible light range (i.e. Infrared light), the CMOS imager 302 is responsive to approximately half the peak sensitivity of light in the visible band.

Figure 9B:
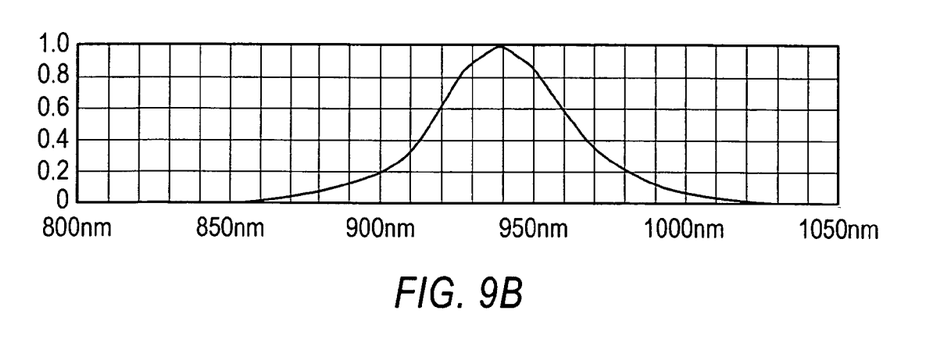
FIG. 9B is a normalized response curve of an infrared light emitting diode.
Figure 9C:
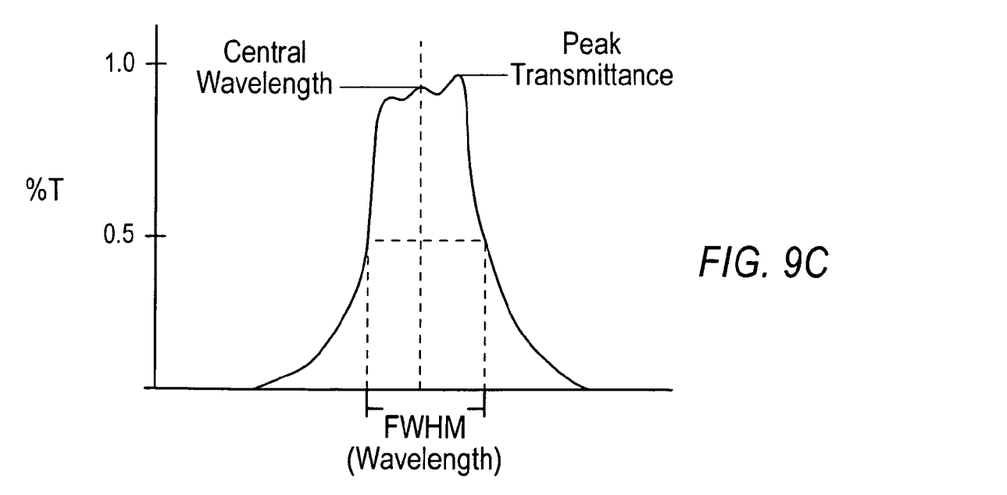
FIG. 9C is a normalized response curve of an infrared band-pass filter.

According to the present embodiment of the invention, the IR illuminators 308 may be specified to emit light between the 850 nm and 950 nm range. Referring to FIG. 9B, a normalized response curve of an IR light emitting diode (LED) is illustrated. To overcome any losses in the optical system 300, an optimal wavelength for an IR illuminator LED 308 may be selected to be approximately equal to 850 nm (i.e., the center wavelength, according to FIG. 9B). Referring to FIG. 9C, a normalized response curve of an IR band-pass filter is shown, and, accordingly, the optical system 300 may include a band-pass filter 22 that may be matched with the IR illuminator 308 to expect the appropriate CMOS imager response as shown in FIG. 9A. As a result, if the IR illuminator 308 is illuminating at 850 nm and if the band-pass filter 22 only accepts 850 nm, the optical system 300 improves the ability to ignore natural, ambient lighting.

Accordingly, the above-described optical systems capture a center-lined, unobstructed image of the operator's profile, P, with reflected optics. If applied in an after-market situation (FIG. 2A) or if installed by an original equipment manufacturer (FIG. 2B), the optical system may be located in a position such that is discretely located or completely hidden from the sight of the vehicle operator and occupants. Even further, if installed by an original equipment manufacturer, the optical system may be located in a position proximate the valance panel and instrument panel ductwork. Accordingly, an area in the instrument cluster (FIGS. 10A and 10B), which is considered to be "prime real estate" for automotive interior designers, is completely avoided. Thus, an improved optical system is provided that may be packaged into a single, compact unit, may free up prime real estate in the instrument cluster area, and consistently provide an unobstructed image of the operator's profile with reflected optics as opposed to direct optics.

While the invention has been specifically described in connection with certain specific embodiments thereof, it is to be understood that this is by way of illustration and not of limitation, and the scope of the appended claims should be construed as broadly as the prior art will permit.

What is claimed is:

1. An optical system comprising:
   at least one illuminator that illuminates a profile of a vehicle operator; and
   an imager in direct optical communication with a reflector, wherein the imager captures a directly reflected image of the vehicle operator profile from the reflector, and the reflector is adhered to a portion of an inboard surface of a vehical windshield in optical communication with the vehicle operator and comprises a reflective layer and a substrate layer, wherein the reflector does not include a metal layer.

2. The optical system according to claim 1, wherein the substrate layer of the reflector includes a quartz material adhered to the inboard surface of the vehicle windshield and layer of the reflector consisting of a multi-layer dielectric coating adhered to the quartz material.

3. The optical system according to claim 2, wherein the imager is positioned on top of a valance panel of the vehicle, proximate the windshield.

4. The optical system according to claim 2, wherein the imager is positioned within a bezel that is located below a plane of a valance panel of the vehicle, proximate the windshield.

5. The optical system according to claim 4, wherein the at least one illuminator is co-located with the imager, and, wherein light from the at least one illuminator is reflected to the vehicle operator's profile.

6. The optical system according to claim 4, wherein the at least one illuminator is remotely located with respect to the location of the imager, and, wherein light from the at least one illuminator is directly radiated to the vehicle operator's profile.

7. The optical system according to claim 6, wherein the at least one illuminator is located about an A-pillar.

8. The optical system according to claim 1, wherein the at least one illuminator is an incandescent lamp.

9. The optical system according to claim 1, wherein the at least one illuminator is a light emitting diode.

10. The optical system according to claim 1, wherein the at least one illuminator is an infrared illuminator.

11. The optical system according to claim 10, wherein the infrared illuminator emits light between the range of 850 nm to 950 nm.

12. The optical system according to claim 10 further comprising an infrared band-pass filter positioned in front of the imager that may be matched with the at least one infrared illuminator.

13. The optical system according to claim 1, wherein the imager is a CMOS camera.

14. The optical system according to claim 1, wherein the imager is a CCD camera.

15. A method for capturing optical images comprising the steps of:
   illuminating a profile of a vehicle operator; positioning an imager in direct optical communication with a reflector, wherein the reflector is in optical communication with the vehical operator and comprises a first layer of quartz material adhered to a portion of an inboard surface of a vehicle windshield and a second layer consisting of a multi-layer dielectric, wherein the reflector does not include a layer of metal material; and
   capturing a directly reflected image of the vehicle operator profile from the reflector.

16. The method according to claim 15, wherein the positioning step further comprises positioning the imager on top of a valance panel of the vehicle, proximate the windshield.

17. The method according to claim 15, wherein the positioning step further comprises positioning the imager within a bezel that is located below a plane of a valance panel of the vehicle, proximate the windshield.

18. The method according to claim 15 further comprising the step of co-locating at least one illuminator with the imager and reflecting light from the at least one illuminator to the vehicle operator's profile.

19. The method according to claim 15 further comprising the step of remotely locating at least one illuminator with respect to the location of the imager and directly radiating light from the at least one illuminator to the vehicle operator's profile.

20. The method according to claim 15 further comprising at least one infrared illuminator and further comprising the step of positioning an infrared band-pass filter in front of the imager to match the radiated light of the at least one infrared illuminator.

21. A method for illuminating and capturing images of a vehicle operator's profile comprising the steps of:
   positioning at least one illuminator within a passenger compartment of a vehicle;
   positioning a reflector on a portion of an inboard side of a windshield in optical communication with a vehicle operator, wherein the reflector comprises a first layer of quartz material and a second layer consisting of a multi-layer dielectric material, wherein the reflector does not include material;
   positioning an imager within the passenger compartment about a valance panel of the vehicle such that the at least one illuminator, reflector, and imager are all in optical communication and the reflector and imager are in direct optical communication; and
   regulating a captured directly reflected image of the vehicle operator profile by positioning the imager at a horizontal distance from the windshield.

22. The method according to claim 21 further comprising the step of increasing or decreasing a vertical distance positioning of the imager to the reflector when the horizontal distance is increased or decreased, respectively.

* * * * *